(12) United States Patent
Östbo

(10) Patent No.: US 6,374,430 B1
(45) Date of Patent: Apr. 23, 2002

(54) TOILET

(75) Inventor: Bertil Östbo, Södertälje (SE)

(73) Assignee: Bertil Ostbo

( * ) Notice: Subject to any disclaimer, the term of this patent is extended or adjusted under 35 U.S.C. 154(b) by 0 days.

(21) Appl. No.: 09/674,662

(22) PCT Filed: May 11, 1999

(86) PCT No.: PCT/SE99/00794

§ 371 Date: Nov. 3, 2000

§ 102(e) Date: Nov. 3, 2000

(87) PCT Pub. No.: WO99/60910

PCT Pub. Date: Dec. 2, 1991

(30) Foreign Application Priority Data

May 12, 1998 (SE) .............................................. 9801656

(51) Int. Cl.⁷ .............................................. E03D 11/00
(52) U.S. Cl. .............................................. 4/420; 4/476
(58) Field of Search .......................... 4/434, 435, 441, 4/476, 111.1–111.6, DIG. 12, 321, 420

(56) References Cited

U.S. PATENT DOCUMENTS

| | | | | |
|---|---|---|---|---|
| 1,299,975 A | * | 4/1919 | McCutcheon | 4/111.1 |
| 1,777,108 A | * | 9/1930 | Schiller | 4/321 |
| 2,279,577 A | * | 4/1942 | Martin | 4/111.1 |
| 2,514,537 A | * | 7/1950 | Cullum | 4/237 |
| 3,890,654 A | * | 6/1975 | Blankenship | 4/111.3 |
| 4,001,108 A | * | 1/1977 | Hellquist | 210/12 |
| 4,156,397 A | * | 5/1979 | Pilolla | 4/321 X |

FOREIGN PATENT DOCUMENTS

| | | |
|---|---|---|
| GB | 17709 | of 1887 |
| GB | 2023690 | 1/1980 |
| SE | 16297 | 12/1902 |

* cited by examiner

Primary Examiner—Charles E. Phillips
(74) Attorney, Agent, or Firm—Sughrue Mion, PLLC

(57) ABSTRACT

Lavatory for connection to a composting container (1) or a sewage pipe forming part of a sewage system. The lavatory has a seat part (11), a lid (12) adapted to the seat part, and a hollow support body (13) supporting the seat part. The support body (13) surrounds or forms an inner duct through which fecal matter passes to the container or the sewage pipe. The rear wall of the duct slopes backwards from the seat part (11) in the downward direction so that it forms an angle ($\alpha$) with the vertical.

17 Claims, 3 Drawing Sheets

TOILET

The present invention relates to a lavatory for connection to a composting container or a sewage pipe forming part of a sewage system, comprising a seat part, a lid adapted to the seat part, and a hollow support body supporting the seat part. The lavatory is particularly suitable for use in a composting toilet of the type comprising a composting container, a lavatory connected to the container and a ventilation duct with a fan leading off from the container.

Composting toilets of the type indicated above have been well-known for a long time and, from the environmental point of view, represent a considerably better alternative for handling biodegradable material than the water-flushing systems frequently used today, which are leading to serious and increasing environmental destruction. A more detailed description of the degradation process used is not included here as it is well-documented in patent literature.

In addition to permitting effective biodegradation of waste, a composting toilet must be hygienic and constructed in such a manner that no unpleasant odours arise in the toilet space. It must also be simple and inexpensive to produce and install and require as few components as possible.

A main object of the present invention is to produce a hygienic and practical lavatory which is suitable for use in dry toilets of the composting type. The invention aims in particular to solve the problem of faecal matter coming into contact with and adhering to the inner surface of the lavatory.

Another object is to produce such a lavatory which, when used in a composting toilet, contributes to effective ventilation of both the toilet space and the composting container.

According to the invention, the first object is achieved by means of a lavatory of the type indicated in the first paragraph, in which the support body surrounds or forms an inner duct through which faecal matter passes to the container or the sewage pipe, the rear wall of the duct sloping backwards from the seat part in the downward direction so that it forms an angle with the vertical.

The result of this sloping of the inner duct of the lavatory is that faecal matter will not, as is the case in previously known lavatories, come into contact with in particular the rear surface of the interior of the lavatory. Without water-flushing, this faecal matter dries and sticks to the inner surface, which is a problem for reasons of both hygiene and appearance.

The inner duct of the lavatory is suitably formed by a tubular drum, the drum sloping backwards from the seat part in the downward direction so that a longitudinal axis of the drum forms an angle with the vertical.

In a preferred embodiment, the slope of the drum is such that a point at the very rear on the delimiting edge of the upper opening of the drum is located essentially directly above the centre of the lower opening of the drum.

The second of the objects of the invention mentioned above is achieved by means of a lavatory according to the above, in which the drum is arranged in a surrounding support body so that a space is formed between the drum and the support body, which space or ducts arranged therein is or are connected to the space in the composting container, ventilation openings being arranged in the outer wall of the support body and/or the lid of the lavatory so that the toilet room is ventilated simultaneously with the composting container via said ventilation openings, said space and/or drum, the composting container and the ventilation duct.

The lavatory will thus constitute an active and essential part of the ventilation of the toilet room and the composting container. In this way, effective and cost-saving ventilation of both the toilet space and the composting container is achieved, with the use of only one ventilation duct with a fan.

The lavatory can also be made in the form of an economy-flush water toilet with an openable valve arrangement or a water trap in the drum, the upper part of the drum being made with ventilation openings so as also to allow ventilation of the space formed in the drum above the valve arrangement or the water trap via the space lying outside simultaneously with the ventilation of the toilet space.

It is preferred that the drum is arranged in a surrounding, essentially tubular support body. The slot-shaped space formed between the drum and the support body can be filled with an adhesive material which interconnects the drum and the support body to form what is known as a sandwich construction. For reasons of hygiene inter alia, at least the drum is made of stainless steel.

A composting toilet with a lavatory of this type is simple and inexpensive to produce, requires few components and brings about very effective ventilation of both the toilet space and the composting container. As the toilet space is ventilated via the lavatory and the composting container, the risk is eliminated of gases being drawn up though the lavatory to the toilet space as a consequence of extraction valves located therein.

Further features of the invention emerge from the patent claims below.

The invention will be described in greater detail below with reference to the embodiments shown by way of examples in the appended drawings.

Figure 1:
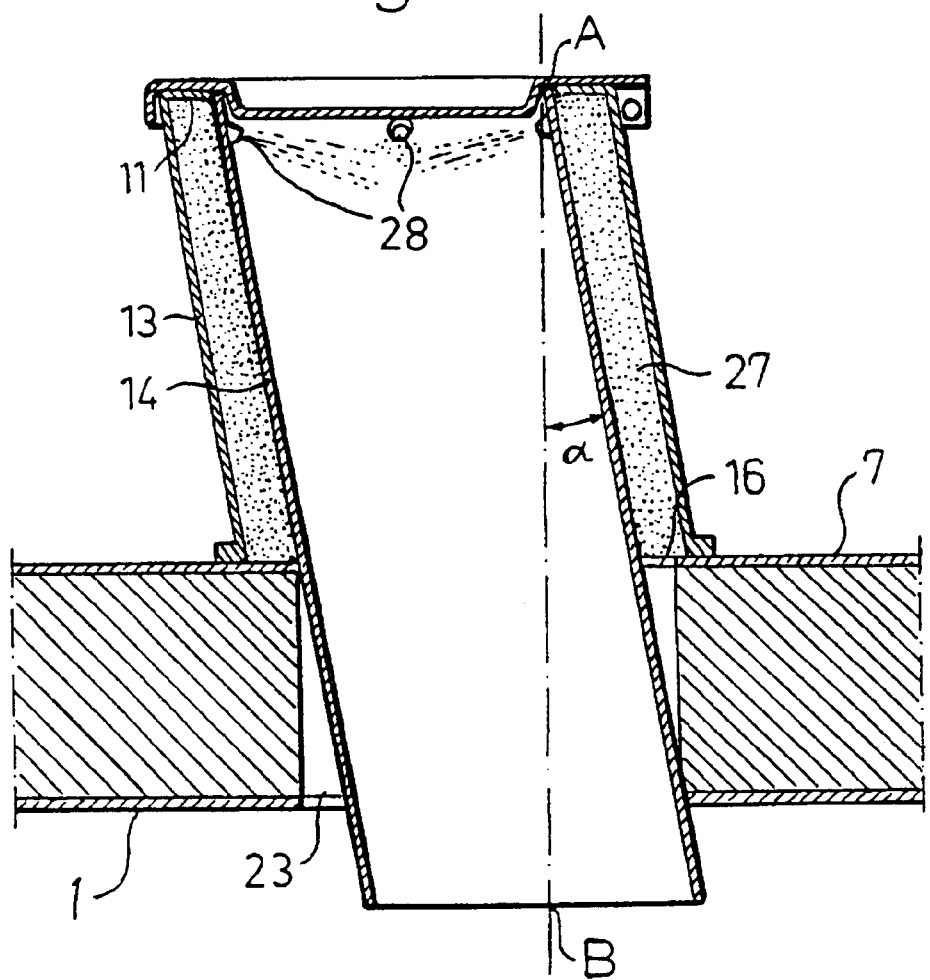
FIG. 1 illustrates the basic construction of a lavatory according to the invention.

FIG. 1 shows diagrammatically an embodiment of a dry lavatory according to the invention. The lavatory comprises a seat part 11 with a lid 12 and a hollow support body 13 supporting the seat part. Arranged in the support body is a tubular drum 14 which is connected to the seat part and intended to receive waste and convey it to a container 1 lying underneath. Between the drum 14 and the support body 13, a space in the form of an annular slot is formed, which in this embodiment is filled with foamed plastic which adheres to and interconnects the shell 13 and the drum 14 to form a very rigid sandwich construction.

If the lavatory is to form part of the ventilation system for the toilet room it is arranged in and the composting container 1 lying underneath, ventilation ducts (not shown) are arranged in the foamed-plastic material 27. The ducts then connect upper ventilation openings in the lavatory to the container lying underneath via an opening 16 in the floor 7 and a corresponding opening 23 in the top part of the container 1, as will be described below with reference to inter alia FIG. 3.

A lavatory according to FIG. 1 is simple to produce and is suitably made in the form of two interconnected tubular pieces made of stainless steel or plastic. Other material, such as porcelain, concrete or the like, can also be used. However, for reasons of hygiene, it is preferred that at least the inner drum 14 is made of stainless steel.

The seat part 11 suitably slopes in slightly towards the drum, which prevents liquid remaining on the seat edge on cleaning. When the toilet is used as a urinal, the sloping prevents urine from remaining on the edge, which is important from the point of view of hygiene.

As can be seen from FIG. 1, the drum 14 forms an angle with the vertical so that the rear wall of the drum slopes backwards from the seat part 11 in the downward direction. This means that faecal matter will fall freely through the drum 14 without coming into contact with the rear wall of the latter.

It is preferred that the drum 14 has such a slope that a point A at the very rear on the delimiting edge of the upper opening of the drum is located essentially directly above the centre B of the lower opening of the drum. The angle α may be of the order of 5–25°, preferably roughly 10°.

In a more conventional design of the lavatory, the whole drum 14 does not have to slope, but it is sufficient in this case for a portion of the rear wall of the drum to slope as shown in the figure. The front wall can be made in a conventional manner.

Reference number 28 indicates a number of nozzles arranged in the upper part of the drum 14, which are connected to a pressurized-water line in order to direct cleaning water-jets onto the inner surface of the drum. Tests have shown that, when a drum made of stainless steel is used, it is necessary to clean this with pressurized-water jets only after a relatively large number of visits, roughly once a week. This is to be compared with the bowls used in today's installations, which need to be cleaned several times a day. Alternatively, the nozzles 28 can be used to spray a water film onto the drum, which prevents faecal matter drying and sticking to the latter. As will be described below, the drum can also be provided with a valve arrangement or a water trap so as to serve as a water toilet.

Figure 2:
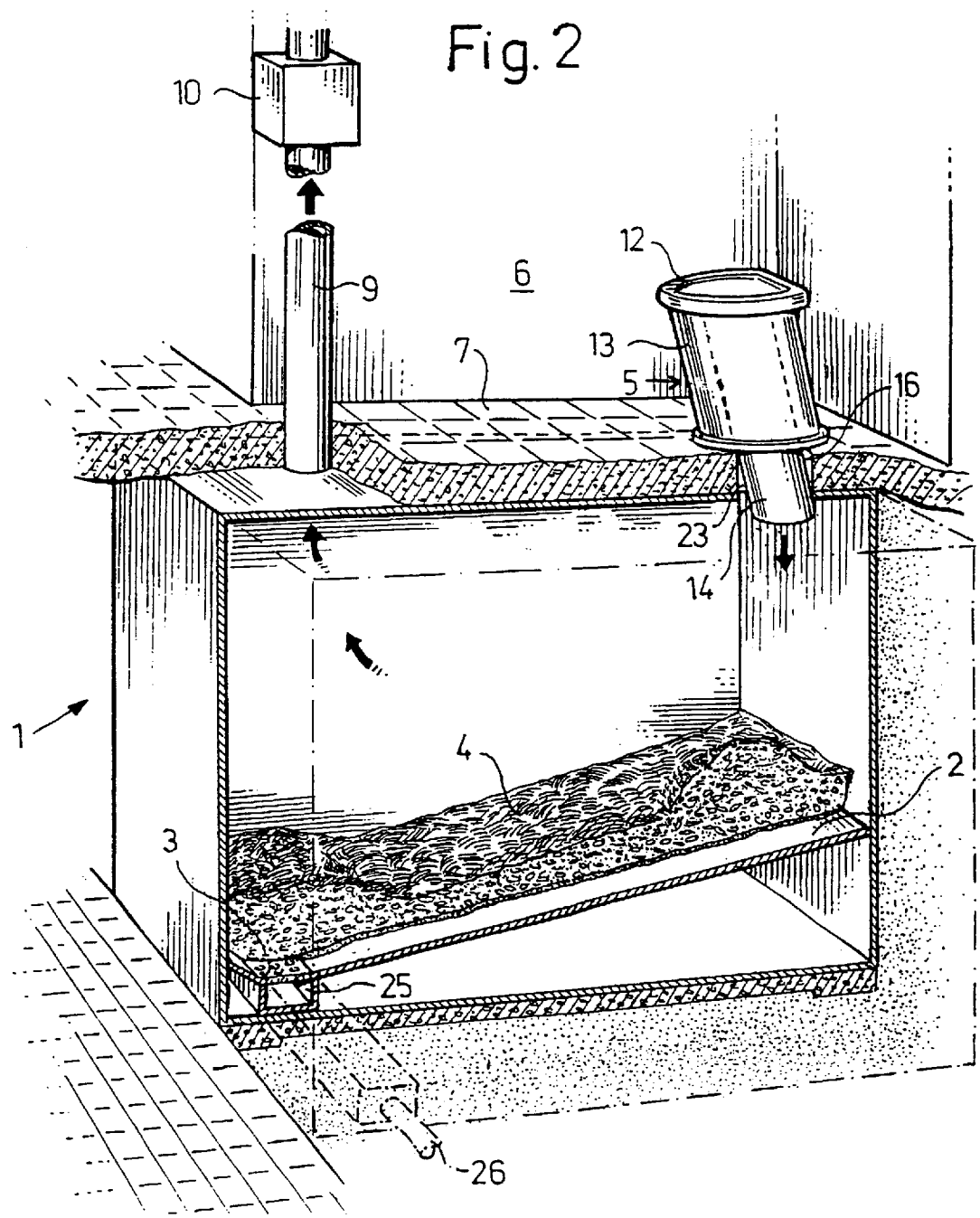
FIG. 2 illustrates the use of a lavatory according to FIG. 1 in a composting toilet.

FIG. 2 illustrates the use of a lavatory according to FIG. 1. In this connection, 1 designates a container which forms a decomposing chamber. In this embodiment, the container is constructed using plane wall sections and comprises a sloping plane 2 inserted subsequently in the form of a separate unit. Alternatively, the bottom of the container can serve as a sloping plane. The container can be constructed in another suitable manner and with any shape and can, for example, consist of two prefabricated halves made of plastic material. It can also be assembled from panel sections and lined by means of a plastic sack. Furthermore, it can be intended to serve more than one lavatory.

The lower part of the sloping plane 2 is made with a screen arrangement 3 for conducting off the liquid which is separated from the composting bed 4. This liquid can be led down to exchangeable containers lying underneath or, as in this embodiment, led out to an interim storage tank or the like via a collecting trough 25 and a pipe 26. If appropriate, the pipe 26 can pass through a soil filter for conversion of the urine into a nutrient liquid.

As the sloping plane 2 is inserted loosely in the container 1, it is suitably made with members which allow the plane 2 to be supported at various heights in order thus to adapt the container to different capacity requirements.

Reference number 5 designates a lavatory which is positioned above a hole in the floor 7 of the toilet space 6. The lavatory is provided with an inner drum 14 through which faecal matter and urine fall down onto the composting bed 4 lying underneath on the sloping plane 2.

In order to ensure an effective degradation process and prevent unpleasant odours in the toilet space 6, effective ventilation of the container 1 is of utmost importance. As shown, a ventilation pipe 9 provided with a fan 10 and connected to the container 1 is provided to this end. The pipe extends up above the ridge on the associated toilet building. In this way, an effective circulation of air from the toilet space 6 via the lavatory 5, the container 1 and from the latter up through the ventilation pipe 9 can be obtained.

Figure 3:
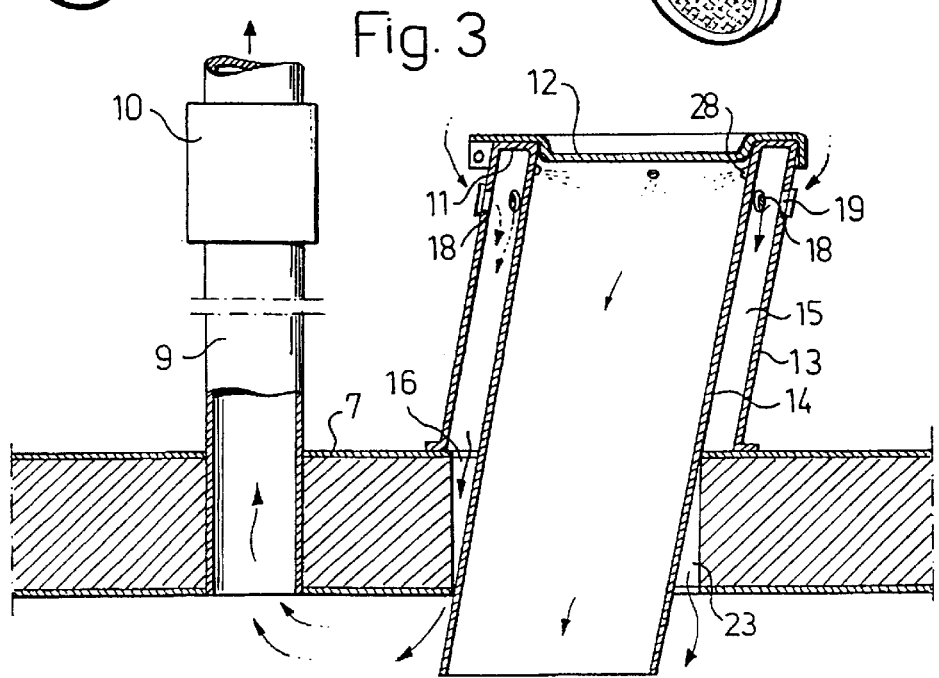
FIG. 3 shows an embodiment of a ventilated dry lavatory.

FIG. 3 shows an embodiment of the lavatory adapted for such ventilation. The slot-shaped space 15 between the support body 13 and the drum 14, which can be filled and provided with ventilation ducts, communicates with the interior of the container 1 via an opening 16 in the floor 7 and a corresponding opening 23 in the top part of the container 1.

Figure 4:
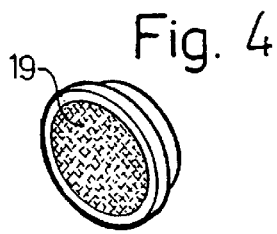
FIG. 4 is a net plug intended for use in the lavatory in FIG. 3.

Arranged in the upper part of the support body 13 are ventilation openings 18 which are covered with an insect net. This is suitably effected by plugs 19 provided with nets, see FIG. 4, being inserted into the openings 18. As previously, reference number 9 designates a ventilation pipe 9 with a fan 10, which pipe suitably extends up above the roof of the toilet building.

With the lavatory shown and the ventilation pipe 9 with the fan 10, it is possible to obtain very good ventilation of both the lavatory itself and the toilet space in which it is arranged and still use a lid 12 which fits closely against the seat part 11 and the drum 14. In the event of good natural ventilation, the fan can be omitted. In order to make the ventilation of the toilet space even more effective, the lid 12 can also be provided with a large number of small holes, suitably covered with nets. This lavatory is also suitably provided with cleaning nozzles 28.

Through the combination of the closely-fitting lid 12 and the net plugs 19, the desired ventilation is obtained without the risk of flies being able to pass from the container 1 into the toilet room or vice versa, as has previously been a problem when use was made of lids which did not fit closely.

When it is desired to use water-flushing toilets, usually of the ultra-economy-flush type, the problem also arises of the space in the lavatory above a valve arrangement or water-trap arranged therein having to be ventilated. Previously, this has taken place, for example, via the lid and extraction in the toilet room.

Figure 5:
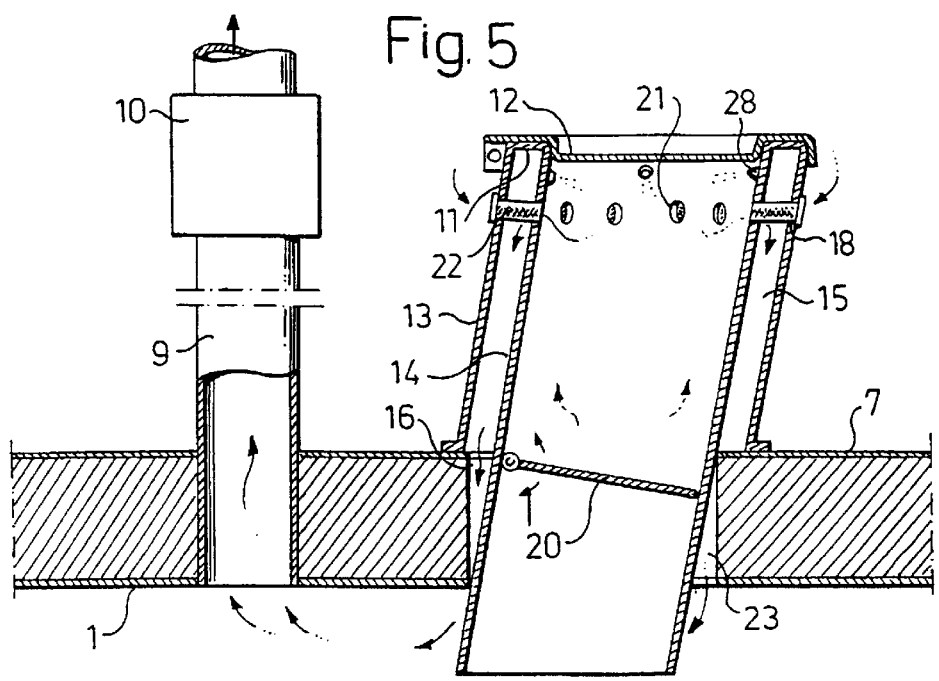
FIG. 5 shows diagrammatically an embodiment of a ventilated economy-flush water lavatory.

According to the present invention, this problem can be solved by means of a lavatory of the type illustrated in FIG. 5. This lavatory is made as an ultra-economy-flush toilet and is provided with a valve arrangement 20 arranged in the central drum 14. In the example shown, the valve is in the form of a flap valve but can just as well consist of a ball valve or another known arrangement, such as a water trap.

Figure 6:
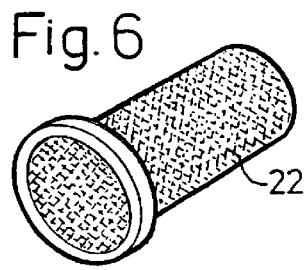
FIG. 6 is a net plug intended for use in the lavatory in FIG. 5.

According to FIG. 5, ventilation of the space in the drum 14 above the valve arrangement 20 is brought about without going via the air in the toilet room. This is achieved by the drum 14 also being provided with ventilation openings 21 which are suitably positioned in line with openings 18 in the support body 13. In this way, plugs 22 provided with nets, see FIG. 6, can be inserted through each pair of ventilation openings.

As illustrated by means of the air-flow arrows in FIG. 5, both the space in the drum 14 above the valve 20 and the surrounding toilet room will be ventilated via the annular slot 15, the container 1 and the ventilation pipe 9. This means that the economy-flush lavatory also can be provided with a closely-fitting lid 12. The space in the drum 14 can of course be ventilated in the illustrated manner via the slot 15 even if there are no openings to the toilet room, if the latter is ventilated in another manner.

As an alternative or in addition to the ventilation openings described above in the lavatory, the lid also can be provided with openings covered with insect nets or be perforated with a large number of small holes.

The invention has been described in connection with the embodiments shown in the drawings. However, these may be varied in a number of respects within the scope of the patent claims, inter alia with regard to the form of the support body and the drum and also the positioning, number and form of the ventilation openings. The support body and the drum can also be combined and, for example, consist of a single pipe. In addition to being connected to a composting container, it is also possible for the lavatory to be connected to a sewage pipe in a sewage system.

What is claimed is:

1. A lavatory for connection to one of a composting container (1) and a sewage pipe forming part of a sewage system, comprising:
    a seat part (11);
    a lid (12) fitted to the seat part;
    a hollow support body (13) supporting the seat part; and
    a duct in the support body (13) through which fecal matter passes to one of the composting container (1) and the sewage pipe,
    wherein the duct is formed by a tubular drum (14), an upper end of the drum is connected to the seat part (11), a rear wall of the drum slopes backwards from the seat part in a downward direction forming an angle (α) with the vertical, and the distance between a front wall and a rear wall of the drum at the upper end of the drum is no shorter than the distance between the front wall and the rear wall at a bottom end of the drum.

2. The lavatory according to claim 1, wherein the slope of the rear wall of the drum (14) is such that a rear most point (A) on the delimiting edge of an upper opening of the drum is located directly above the center (B) of a lower opening of the drum.

3. The lavatory according to claim 1, wherein the angle (α) is of the order of 5–25°.

4. The lavatory according to claim 1, further comprising:
    a number of nozzles (28) arranged in an upper part of the duct and adapted to direct cleaning water-jets against an inner wall of the duct.

5. The lavatory according to claim 1,
    wherein the lavatory is positioned in a toilet room (6) and connected to the composting container (1) lying underneath the toilet room, the composting container being provided with a ventilation duct (9),
    wherein the drum (14) is arranged in the support body (13) so that a space (15) is formed between the drum and the support body, and at least one of the space and the duct connects to an interior of the composting container (1),
    wherein the lavatory further comprises ventilation openings (18) arranged in at least one of a wall (13) of the support body and the lid (12) so that the toilet room (6) is ventilated simultaneously with the composting container (1) via the ventilation openings (18), at least one of the space (15) and the drum (14), the composting container (1), and the ventilation duct (9).

6. The lavatory according to claim 5, wherein the lavatory is an economy-flush water toilet, and further comprises:
    one of an openable valve arrangement (20) and a water trap provided in the drum (14); and
    ventilation openings (21) provided in an upper part of the drum so as also to allow ventilation of a portion of the drum above one of the valve arrangement and the water trap (14) via the space (15) simultaneously with the ventilation of the toilet room (6).

7. The lavatory according to claim 1,
    wherein the drum (14) is surrounded by the support body (13), and
    wherein a slot-shaped space (15), which is formed between the drum and the support body, is filled with an adhesive material (27) that interconnects the drum and the support body to form a sandwich construction.

8. The lavatory according to claim 7, wherein the adhesive material (27) is a foamed-plastic, and the drum (14) is made of stainless steel.

9. The lavatory according to claim 8, wherein ventilation ducts are arranged in the foamed-plastic (27), and the support body (13) is made of one of stainless steel and plastic.

10. The lavatory according to claim 3, wherein the angle (α) is 10°.

11. A lavatory, comprising:
    a seat part (11);
    a lid (12) fitted to the seat part;
    a hollow support body (13) supporting the seat part; and
    a duct in the support body (13) through which fecal matter passes,
    wherein the duct is formed by a tubular drum (14), an upper end of the drum is connected to the seat part (11), and a rear wall of the drum slopes from the seat part such that a rear most point (A) on the delimiting edge of an upper opening of the drum is located directly above the center (B) of a lower opening of the drum.

12. A lavatory, comprising:
    a seat part (11);
    a lid (12) fitted to the seat part;
    a hollow support body (13) supporting the seat part; and
    a duct in the support body (13) through which fecal matter passes, wherein the duct is formed by a tubular drum (14), an upper end of the drum is connected to the seat part (11), and a rear wall of the drum slopes backwards from the seat part in a downward direction; and
    a number of nozzles (28) arranged in an upper part of the duct and adapted to direct cleaning water-jets against an inner wall of the duct.

13. A lavatory for connection to one of a composting container (1) and a sewage pipe forming part of a sewage system, comprising:
    a seat part (11);
    a lid (12) fitted to the seat part;
    a hollow support body (13) supporting the seat part; and
    a duct in the support body (13) through which fecal matter passes to one of the composting container (1) and the sewage pipe,
    wherein the duct is formed by a tubular drum (14), an upper end of the drum is connected to the seat part (11), and a rear wall of the drum slopes backwards from the seat part in a downward direction forming an angle (α) with the vertical,
    wherein the lavatory is positioned in a toilet room (6) and connected to the composting container (1) lying underneath the toilet room, the composting container being provided with a ventilation duct (9),
    wherein the drum (14) is arranged in the support body (13) so that a space (15) is formed between the drum and the support body, and at least one of the space and the duct connects to an interior of the composting container (1), wherein the lavatory further comprises ventilation openings (18) arranged in at least one of a wall (13) of the support body and the lid (12) so that the toilet room (6) is ventilated simultaneously with the composting container (1) via the ventilation openings (18), at least one of the space (15) and the drum (14), the composting container (1), and the ventilation duct (9).

14. The lavatory according to claim 13, wherein the lavatory is an economy-flush water toilet, and further comprises:

one of an openable valve arrangement (20) and a water trap provided in the drum (14); and ventilation openings (21) provided in an upper part of the drum so as also to allow ventilation of a portion of the drum above one of the valve arrangement and the water trap (14) via the space (15) simultaneously with the ventilation of the toilet room (6).

15. A lavatory comprising:

a seat part (11);

a lid (12) fitted to the seat part;

a hollow support body (13) supporting the seat part; and a duct in the support body (13) through which fecal matter passes, wherein the duct is formed by a tubular drum (14), an upper end of the drum is connected to the seat part (11), and a rear wall of the drum slopes backwards from the seat part in a downward direction, wherein the drum (14) is surrounded by the support body (13), and wherein a slot-shaped space (15), which is formed between the drum and the support body is filled with an adhesive material (27) that interconnects the drum and the support body to form a sandwich construction.

16. The lavatory according to claim 15, wherein the adhesive material (27) is a foamed-plastic, and the drum (14) is made of stainless steel.

17. The lavatory according to claim 16, wherein ventilation ducts are arranged in the foamed-plastic (27), and the support body (13) is made of one of stainless steel and plastic.

* * * * *